Patented May 9, 1950

2,507,111

UNITED STATES PATENT OFFICE 2,507,111

CONDENSATION PRODUCT OF STEAROYL PHENOL WITH SULFUR DICHLORIDE

Eugene Lieber, Chicago, Ill., assignor to Standard Oil Development Company, a corporation of Delaware No Drawing. Application July 5, 1946, Serial No. 681,597

2 Claims. (Cl. 260—592)

This invention relates to a novel type of chemical condensation product and to methods of preparing such products and using them for various purposes, more particularly as pour depressors in waxy lubricating oils and as oiliness agents.

Broadly, this invention comprises the production of a novel type of condensation product by reacting an aliphatic aromatic ketone with a sulfur halide, preferably a sulfur chlorine compound such as sulfur monochloride, $S_2Cl_2$, and/or sulfur dichloride, $SCl_2$, especially to produce a high molecular weight by oil-soluble condensation product.

The aliphatic aromatic ketone to be used is preferably one having the general formula R—CO—Ar—Y in which R represents a saturated hydrocarbon group, Ar is an aromatic hydrocarbon group and Y is selected from the class of hydroxy and amino groups. The group R may be straight, branched or cyclic; it is preferably an aliphatic hydrocarbon group and preferably contains more than 10 carbon atoms. Examples include: lauryl, cetyl, tri-isobutyl, octadecyl, paraffin wax radical, petroleum naphthenyl, etc. The group Ar may represent: benzene, naphthalene, anthracene, phenanthrene, diphenyl, toluene, xylene, ethyl benzene, butyl benzene, amyl benzene, etc. and Ar—Y therefore may represent: phenol, alpha-and/or beta-naphthol, cresol, tertiary-amyl-phenol, aniline, alpha-naphthylamine, xylidine, etc. Instead of using single pure ketone compounds, it is possible, and sometimes preferable, to use ketones derived by acylation of mixed phenols, etc., such as those obtained from coal tar fractions, as well as the so-called petroleum phenols, which are mixed alkylated phenols having an average composition corresponding approximately to a butyl phenol.

Although the preparation of such ketones does not constitute part of the present invention, it may be explained that they may be suitably prepared by condensing fatty acid chlorides, e. g., stearyl chloride

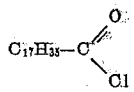

with a suitable aromatic compound, such as those obtained from coal-tar fractions; this condensation is usually carried out by means of a Friedel-Crafts catalyst.

The other reactant to be used according to this invention may be termed "sulfur halides" and, as such, I prefer to use the sulfur chlorides such as sulfur monochloride and/or sulfur dichloride, preferably the latter.

Thus the primary chemical reaction involved in the present invention may be expressed by the following chemical equation:

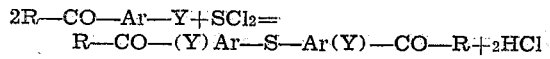

This reaction is accompanied or followed by other substantially similar reactions, in which the product of the first reaction is interlinked with additional molecules of the aliphatic aromatic ketone with the resultant formation of higher molecular condensation products which may be considered to have a linear-chain type structure. One graphic representation of such a product is as follows:

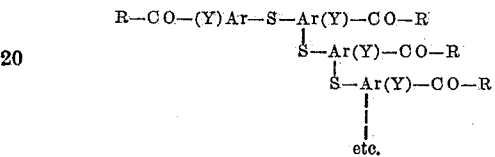

Thus the high molecular weight condensation products may be considered to have the general formula:

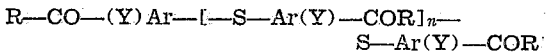

where $n$ is a subscript indicating the degree of condensation and is at least 1.

In the case of stearoyl phenol condensed with $SCl_2$ the polymeric condensation product is represented by the formula:

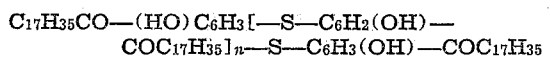

To effect the condensation, it is preferred to use a condensation catalyst such as $AlCl_3$, $ZnCl_2$, $BF_3$, $FeCl_3$, $TiCl_4$, etc.

The proportions in which the reactants should be used are about 5-50 parts by weight of sulfur chloride, preferably 20-40 parts by weight thereof, to 100 parts by weight of aliphatic aromatic ketones. The condensing agent is used in much smaller, i. e. catalytic, quantities such as about ½-15, preferably 2-10, parts by weight per 100 parts by weight of aliphatic aromatic ketone.

In carrying out the invention, the reaction temperature should be maintained between the approximate limits of 80° to 200° F., preferably in the range 100-125° F., the reaction time will vary inversely with the temperature, but preferably should be about ½ to 10 hours, or usually 1 to 3 hours. Although not essential, a solvent can be used and of these, those inert to the reaction should be used, such as pretreated kerosene, carbon bisulfide, nitro benzene, dichlorbenzene, tetrachlorethane, etc.

When the reaction has been completed it is generally desirable to cool the reaction mixture and dilute it, e. g., with refined kerosene or tetrachlorethane. The catalyst is then decomposed by adding water, or alcohol-water mixture, dilute acids, etc. After settling, the aluminous or other catalyst sludge is drawn off. The kerosene or tetrachlorethane extract of the product is washed with water until free of acid and finally distilled under vacuum or with fire and steam to about 600° F., in order to remove the solvent and low-boiling products.

The distillation residue is the desired high molecular weight condensation product and is substantially non-volatile at about 600° F. under reduced pressure. Generally, the molecular weight of this product is at least 1,000, and may be as high as 3,000 or so. In most cases it is a viscous oil and has a color ranging from red to dark brown. It is soluble in lube oils. In pale oils it has been found to impart a pleasing so-called Pennsylvania type of coloration, i. e., a greenish fluorescence with a deep-red through color.

The product of this invention has the property of modifying the crystal structure of waxes, such as paraffin wax, when added to compositions containing the same. For instance, when about .05 to 10%, preferably 2 to 5%, of this wax modifier is added to a waxy lubricating oil such as a Pennsylvania type lubricating oil having a relatively high pour point, or a waxy oil below the ordinary lubricating oil boiling range, e. g. a hydraulic oil, the resultant blend will have a substantially lower pour point; in other words this wax modifier is an effective pour depressor for waxy oils. A small amount of this wax modifier is also useful as a dewaxing aid for removing wax from mineral lubricating oils of undesirably high wax content. In similarly small amounts this wax modifier may also be incorporated into paraffin wax or compositions containing the same to be used for various purposes such as for coating or impregnating paper, etc., or for making various molded products.

The products of this invention are polyfunctional since they also have the property of imparting so-called "extreme pressure" lubricating properties to oils when blended therein in suitable concentrations, say 2–15% and preferably 5–10%. That is, the products of this invention possess the property of imparting to the lubricant a very high film strength. This permits the use of smaller bearings and enables the journals and other types of bearings to be operated under more severe conditions of load, speed and the like. Such lubricating oils find valuable application for use in the so-called "breaking-in-oils."

The phenolic and amino aromatic groups present in the condensation products of this invention also have some oxidation inhibiting properties.

Although when the condensation products of this invention are added to lubricating oils, primarily for the purpose of reducing the pour point thereof, they would naturally be added generally to paraffinic type of oils, such as Pennsylvania oils or fractions thereof, or certain paraffinic fractions derived from other types of crudes, yet when these condensation products are used as oiliness agents they may, of course, be added to lubricating oil base stocks derived from all types of crudes, such as not only the paraffinic oils but also naphthenic mixed base crudes, and even asphaltic base crudes.

As an additional feature of the invention, instead of first preparing an aliphatic aromatic ketone as indicated heretofore, and then reacting it with the sulfur halide as described, one may prepare the ketones by reacting an acyl halide with a phenolic or amino aromatic compound in the presence of a Friedel-Crafts catalyst, and then immediately, without separating the resultant ketone from the catalyst, add the desired amount of sulfur halide, with or without additional quantities of catalyst, heat the reaction mixture to insure completion of the reaction to the desired stage for the production of the high molecular weight sulfur-containing condensation product, then hydrolyze and remove the catalyst, subject the reaction products to distillation, and recover the desired high molecular weight product as distillation residue, substantially as described hereinabove.

For the sake of illustration, but without desiring to limit the invention to the particular materials used, the following experimental data are given.

A series of three tests were made in which a ketone, stearoyl phenol, which had been made by condensing stearyl chloride with phenol, was treated with sulfur dichloride in the presence of aluminum chloride as catalyst, using 200 grams of the ketone in each case and various amounts of sulfur dichloride and aluminum chloride as indicated in the following table, and in all cases using a reaction temperature of 125° F. with a reaction time of three hours. The yield of product, together with the pour point data, is also shown in the table. As indicated, the aluminum chloride was added last in test 3, whereas in the other reactions the sulfur chloride was added last. For general reference, test 1 was also included as control test, merely to show that before sulfurization the ketones per se had little pour-point depressing effect, as such materials are generally not considered effective unless they lower the pour point of the waxy mineral lubricating oil from about +30 down to about 0° F. in the regular A. S. T. M. pour point test.

| Test No. | Gms. SCl$_2$ | Gms. AlCl$_3$ | Added Last | | Yield, Gms. | A. S. T. M. Pour Points (°F.), On Blends in +30° F. Pour Point Oil With Addition of— | |
|---|---|---|---|---|---|---|---|
| | | | SCl$_2$ | AlCl$_3$ | | 2.0% | 5.0% |
| 1 | | | | | | +10 | +15 |
| 2 | 57 | 12.0 | x | | 166 | −15 | −20 |
| 3 | 57 | 12.0 | | x | 159 | −15 | −20 |
| 4 | 40 | 8.0 | x | | 150 | −10 | −15 |

It is noted from the above table that reaction of the stearoyl phenol ketone with sulfur dichloride effected a very substantial reduction or depressing of the pour point as compared with the untreated ketone tested in a lubricating oil base stock having an original pour point of +30° F. The untreated ketone per se when tested in 2% and 5% blends in the same lubricating oil base stock reduced the pour point slightly, to +10° F. and +15° F., respectively; but on the other hand, the treated ketone produced blends having pour points 20° to 45° (F.) lower than the corresponding blend obtained with the untreated ketone. This is indeed a surprising result, in view of the fact that the primary starting material, namely, the ketone, is a chemical compound having a relatively simple chemical structure.

That the condensation products of this invention have pour depressing properties is quite surprising, in view of the fact that a product made by first condensing amyl phenol with sulfur dichloride and then reacting the resultant product with stearoyl chloride is not a pour depressor. This is indicated by the following data:

328 grams of p-tertiary amyl phenol was dissolved in ethylene dichloride (500 cc.) contained in a 2-liter, 3-necked flask equipped with a refluxing condenser. While stirring, 103 grams of sulfur dichloride ($SCl_2$) was added over a period of 30–40 minutes holding the temperature at 100–130° F. After the addition of the $SCl_2$ the reaction temperature was raised to reflux (145° F.) and held thereat for one hour. The product was then recovered by removing the ethylene dichloride by distillation, taking off the last trace of solvent under high vacuum. A yield of 448.6 grams of p-tertiary amyl phenol sulfide was obtained as product.

In reacting this product with stearoyl chloride, the procedure of U. S. 2,319,662, Example I, page 2, was followed as accurately as possible in this preparation. 92 grams of tertiary amyl phenol sulfide (prepared as described above) was dissolved in 70 cc. of ASTM naphtha, and 153 grams of stearoyl chloride was added to the reaction mixture with vigorous stirring. After the addition of the stearoyl chloride the reaction mixture was heated to reflux (160° F.) and held thereat for 30 minutes. After cooling, 23 grams of anhydrous aluminum chloride was added and the resulting mixture heated to reflux temperature (160–165° F.) and held thereat for two hours. The reaction mixture was then cooled to 90° F. and 200 cc. of 10% cold hydrochloric acid added. After stirring thoroughly, 150 grams of toluene was added and the reaction mixture allowed to settle. The aqueous layer was then separated and discarded. The solvent layer was washed once with warm 10% hydrochloric acid and twice with hot water. The product was then recovered by removing the solvent by distillation, taking off the last traces under high vacuum. A yield of 238 grams of a reddish brown, heavy liquid was obtained as product and it was tested for pour depressing properties by blending in various concentrations in a waxy lubricating oil having an original pour point of +30° F., and determining the pour point of the resulting blends by the standard ASTM procedure. The following results were obtained:

|  | Pour point, °F. |
|---|---|
| Blend oil | +30 |
| Blend oil+0.25% product | +30 |
| Blend oil+0.50% product | +30 |
| Blend oil+1.0% product | +30 |
| Blend oil+2.0% product | +25 |

These data show clearly that this product, which is stated in the patent referred to as being 2-stearoyl-4-amyl phenol monosulphide, is not a pour depressor.

It is believed that the chief difference between this product and applicant's product which does have pour depressing properties is that applicant's product is a polymeric condensation product of much higher molecular weight.

This application is a continuation-in-part of application Serial No. 424,541, filed December 26, 1941, now abandoned.

I claim:

1. A high molecular weight condensation product of sulfur dichloride with stearoyl phenol, having the general formula

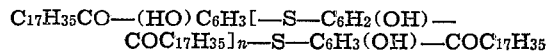

$$C_{17}H_{35}CO\text{—}(HO)C_6H_3[\text{—}S\text{—}C_6H_2(OH)\text{—}COC_{17}H_{35}]_n\text{—}S\text{—}C_6H_3(OH)\text{—}COC_{17}H_{35}$$

where $n$ is at least 1 said condensation product being oil soluble and having a molecular weight of about 1,000 to 3,000.

2. Product according to claim 1, being substantially non-volatile up to about 600° F. under reduced pressure, and having wax-modifying properties.

EUGENE LIEBER.

REFERENCES CITED

The following references are of record in the file of this patent:

UNITED STATES PATENTS

| Number | Name | Date |
|---|---|---|
| 893,499 | Homolka | July 14, 1908 |
| 1,756,817 | Ellis et al. | Apr. 29, 1930 |
| 2,174,248 | Mikeska et al. | Sept. 26, 1939 |
| 2,198,828 | Lieber et al. | Apr. 30, 1940 |
| 2,239,534 | Mikeska et al. | Apr. 22, 1941 |
| 2,306,354 | Cook et al. | Dec. 22, 1942 |
| 2,319,662 | Cook | May 18, 1943 |
| 2,346,826 | Cook et al. | Apr. 18, 1944 |

OTHER REFERENCES

Airan et al., Chemical Abstracts, vol. 35, cols. 6950–6951 (1941).